Jan. 6, 1942.    J. J. DE CARLI    2,269,012
INDIVIDUAL STALL SYSTEM FOR COW MILKING
Filed March 18, 1940    4 Sheets-Sheet 1
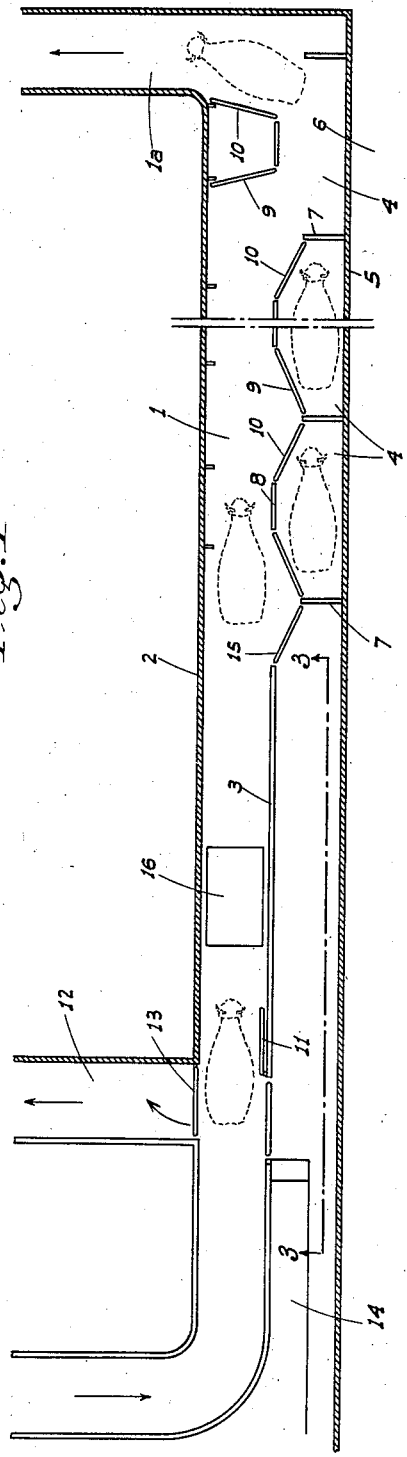
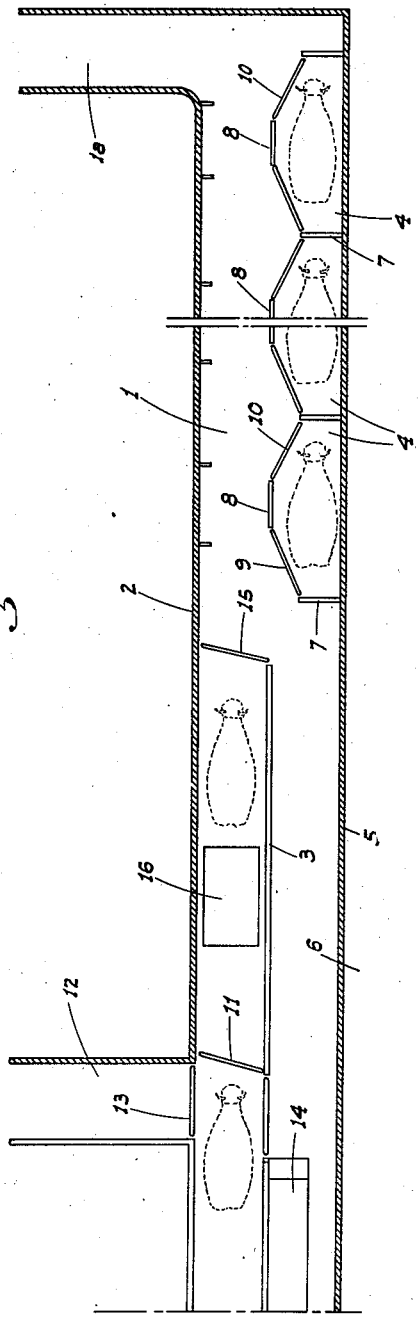
INVENTOR
*John J. DeCarli*
BY
*Urbits & Urbits*
ATTORNEYS

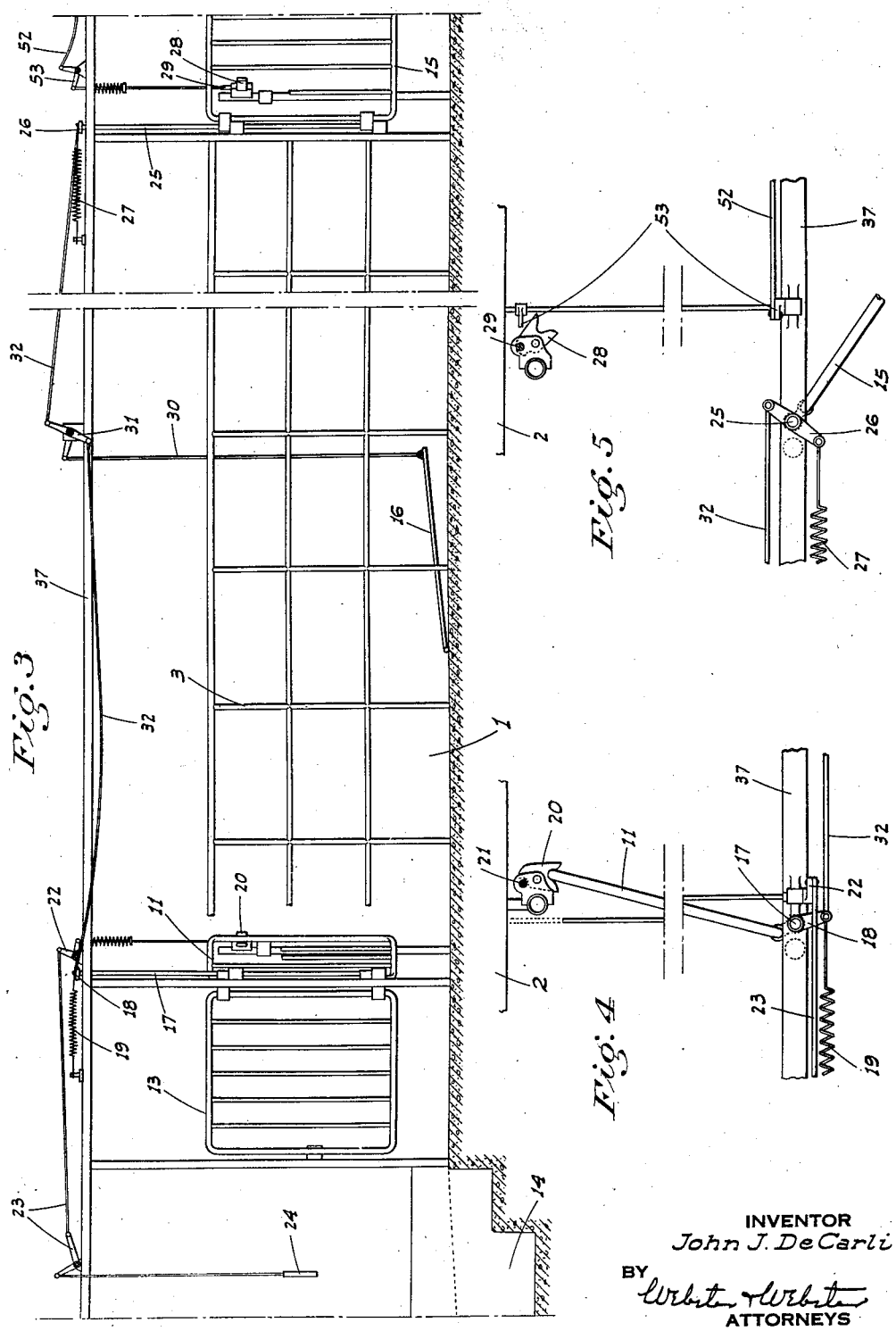

Jan. 6, 1942.  J. J. DE CARLI  2,269,012
INDIVIDUAL STALL SYSTEM FOR COW MILKING
Filed March 18, 1940  4 Sheets-Sheet 4

INVENTOR
John J. De Carli
BY
*Corbett & Webster*
ATTORNEYS

Patented Jan. 6, 1942

2,269,012

UNITED STATES PATENT OFFICE 2,269,012

INDIVIDUAL STALL SYSTEM FOR COW MILKING

John J. De Carli, Stockton, Calif.

Application March 18, 1940, Serial No. 324,525

11 Claims. (Cl. 119—16)

This invention relates to the dairy industry, and particularly to the disposing of the cows for milking. My main object is to provide an individual stall system for the cows to be milked, and passages or runways leading to and from the stalls, so arranged that movement of the cows into and out of the various stalls is facilitated without manual aid or guiding, and so that when the milking of a cow in any stall is completed, that cow is permitted to leave the stall and return to the barn, and another cow permitted to enter the stall without any manual attention or assistance other than the manipulation of a pair of levers by the milker, and without interfering with the cows in the other stalls.

By reason of the fact that the milker need devote but little attention to handling and supervising the movement of the cows, he can easily attend to milking a number of cows at one time.

As a matter of actual test, I have found that one milker, without undue stress or rush, can milk 120 cows in 2½ hours time.

A further object and advantage of the system is that the number of operators necessary to handle or control the movements of the herd is considerably reduced over what is necessary with other systems, and one man, stationed at a strategic point, can inspect the cows as they move toward the milking stalls, and can bypass any cows which for any reason are not in condition to be milked. He can also conveniently start the cows as they pass his station.

Also, the system is arranged so that the milking floor, on which the milking machines are disposed, as well as the milker himself, are always segregated from direct contact with the cows, so that it is easier for the milker to keep the machines and himself cleaner and more sanitary than is now the case.

These objects I accomplish by means of such structure and relative arrangement of parts as will fully appear by a perusal of the following specification and claims.

In the drawings similar characters of reference indicate corresponding parts in the several views:

Figure 1 is a diagrammatic plan of the system, showing one stall opened to permit of the movement of a milked cow from the stall, and the entry of a cow to be milked into the stall.

Figure 2 is a similar view, showing all stalls occupied.

Figure 3 is a fragmentary sectional elevation, on line 3—3 of Fig. 1, showing the initial entry gates in the passageway to the stalls, and their control means.

Figure 4 is a fragmentary plan showing the first gate in latched position.

Figure 5 is a similar view, showing the second gate in an open position and illustrating the corresponding latch means in position to be engaged by said gate when moved to a closed position.

Figure 6:
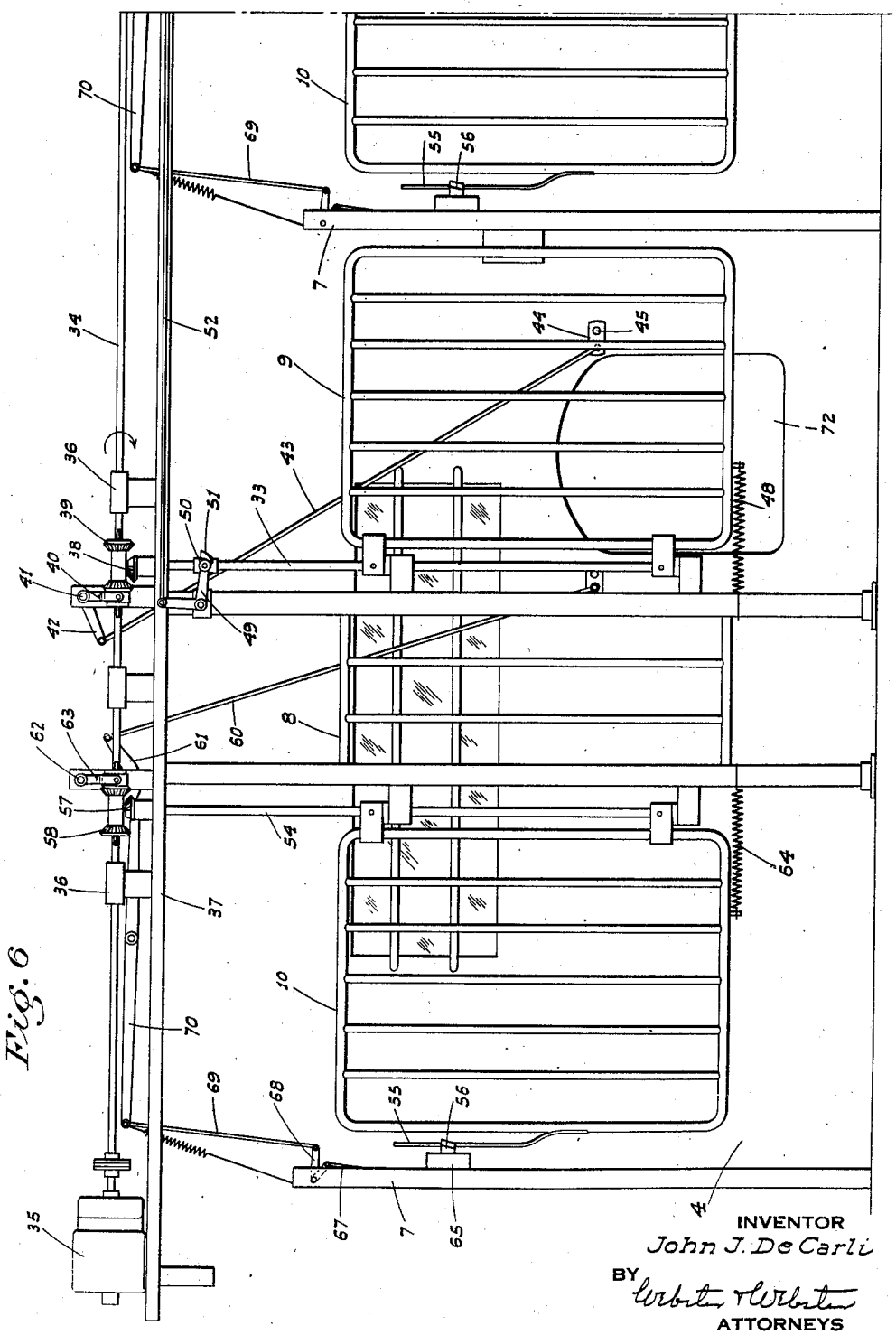
Figure 6 is a side elevation of a stall showing both gates closed.
Figure 7:
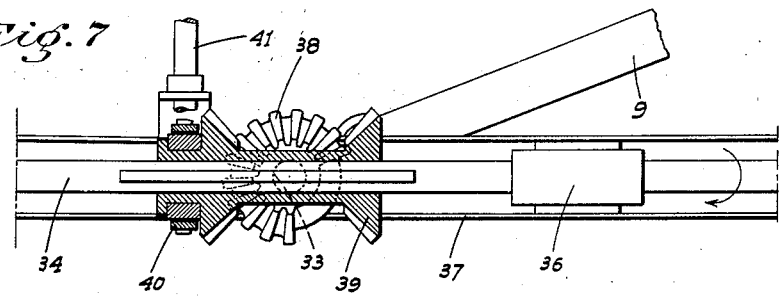
Figure 7 is a fragmentary plan showing the mechanism controlling the opening and closing of the entry gate of a stall.
Figure 8:
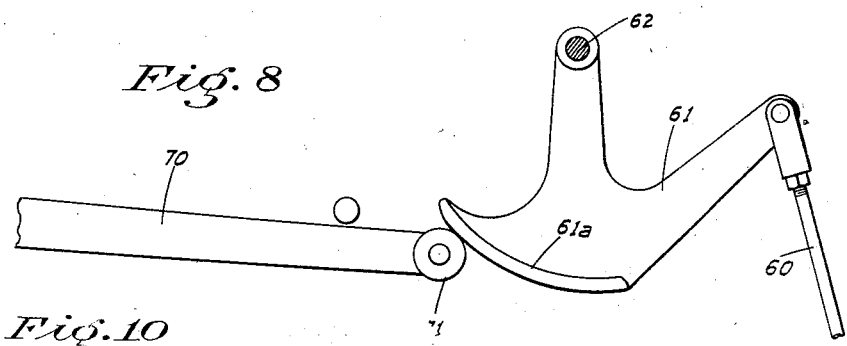
Figure 8 is a fragmentary side elevation showing the latch release control unit of the exit gate of a stall.

Referring now more particularly to the characters of reference on the drawings, the system in general comprises a relatively long passageway 1 defined on one side by a wall 2 and for the initial portion of its extent on the other side by a railing 3 or the like.

Beyond the railing is a row of individual cow milking stalls indicated generally at 4, and which communicate with the passage 1 on the side thereof opposite wall 2. A continuous wall 5 extends along the outer side of the stalls, which separates the stalls from the milking floor 6, the level of which is about 30″ below the level of the floor of the stalls, for the purpose which will be seen later. Each stall includes end walls 7, a central inner railing or wall unit 8 substantially alined with railing 3, and entry and exit gates 9 and 10 respectively extending between unit 8 and the end walls; the entry gates being those nearest the initial portion of passage 1. The gates are disposed so that when swung open, they extend to wall 2 and shut off the passageway 1 as indicated in Fig. 1. Beyond the far end of the row of stalls, passageway 1 forms an extension 1a leading back to the barn.

The passage 1 at its inception leads from the barn and throughout its extent is of a width sufficient only to receive cows in single file order. Some distance from the adjacent end of the row of stalls, a gate 11 is hinged in connection with railing 3 and is adapted when closed to extend across said passageway and close the same as shown in Fig. 2, and when open to lie parallel to and adjacent the railings as shown in Fig. 1. Just back of said gate, a bypass exit passage 12 opens away from wall 2, this passage being normally closed by manually operable gate 13.

A pit 14 extends lengthwise of the passageway outside railing 3 and terminates adjacent but back of gate 11. This pit accommodates an operator who is thus somewhat below the level of the cows passing by, and is in a convenient position not only to wash and start the cows, but also to inspect their udders, etc. If he finds that any particular cow is not in condition to be milked, he leaves gate 11 closed and opens gate 13, bypassing that cow back to the barn. To facilitate the operations of the washer and inspector, the railing 3 is omitted for the length of the pit.

At the head end of railing 3 is another gate 15. This gate is hingedly mounted in connection with the railing and is adapted to extend either from said railing to the adjacent end wall 7 of the adjacent stall 4, as shown in Fig. 1, or from said railing to the wall 2 to close passageway 1, as shown in Fig. 2.

Between gates 11 and 15, a platform 16 is mounted in the passageway 1 for engagement by each cow in turn, said platform being pivoted at floor level at its end nearest gate 11 and being normally raised somewhat at its opposite end as shown in Fig. 3.

In operation, gate 11 is initially closed, and when any stall entry gate is opened, gate 15 is opened also. A cow previously held in the passage enclosure formed between gates 11 and 15 is therefore now free to walk from said enclosure and into the stall whose entry gate has been opened. The cow cannot pass beyond such stall since as previously stated, the gate 9 closes off the passageway 1.

The operator then allows gate 11 to open, allowing a cow back of said gate to walk toward gate 15 and over the platform. The weight of the cow on the platform, however, closes gate 15 and also gate 11, so that said cow is again restrained and must wait until the gate 15 is again opened by the opening of another stall entry gate.

The opening of gate 11 is controlled by the operator in the pit 14, and the opening and closing of the stall gates is controlled by the milker from floor 6 outside the stall area. Opening of any stall entry gate controls the opening of gate 15, while at stated, the weight of a cow on the platform controls the closure of both gates 11 and 15.

The various mechanisms by which these gate operations are effected will now be described.

Gate 11 is fixed on a rotary shaft 17 journaled in connection with railing 3 and having an arm 18 on top to which a tension spring 19 is applied in a direction to open the gate. The gate when closed is engaged by a horizontal crotch type swinging latch member 20 mounted adjacent wall 2 and normally prevented from swinging movement in a gate releasing direction by a vertically movable keeper pin 21. Said pin is pulled up to release the latch member by suitable connection with an elevated bell crank unit 22, one arm of which is operatively connected with the pin, while the other arm is operatively connected by suitable linkage 23 with a pull handle 24 depending in a position convenient to the operator in pit 14. When the operator pulls the handle, the gate, if closed, will then swing to an open position.

Gate 15 is also fixed on a turnable shaft 25 journaled in connection with railing 3, said shaft carrying an arm 26 to which a pull spring 27 is applied in a direction to swing the gate open.

A latch member 28, of the same nature as member 20, is mounted adjacent wall 2 in position to engage and hold the gate closed, and release of this member is effected by a vertically movable keeper pin 29. This pin, however, is not released by the pit operator, but by opening of the entry door of any stall, as will be seen later.

A pull rod 30 is attached to and extends upwardly from the free end of the platform 16, this rod being operatively connected with a swing arm 31. The arm 31 is connected to the gate arms 18 and 26 by flexible pull members 32 in such a manner that when the ramp is lowered, a pull is exerted on said arms 18 and 26 in a direction to swing the corresponding gates closed.

Figure 10:
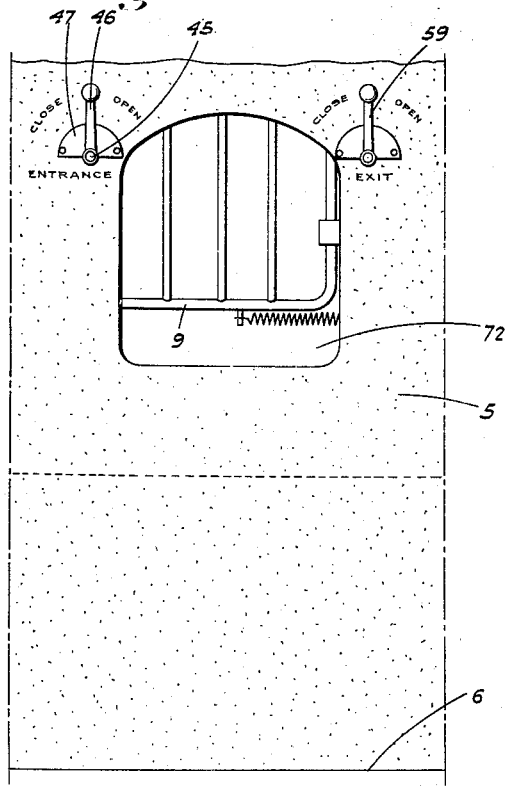
Figure 10 is a fragmentary side elevation looking toward a stall from the milking room.
Figure 9:
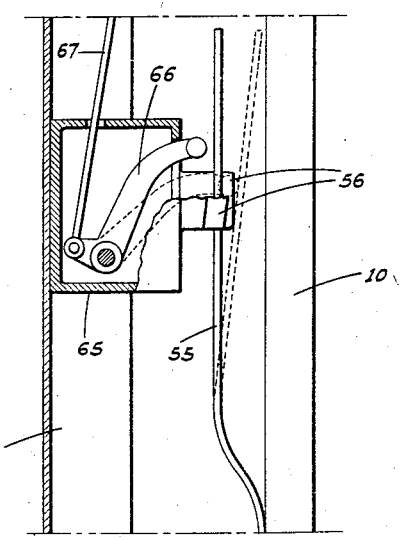
Figure 9 is a fragmentary sectional elevation showing the releasable latch device of the exit gate of a stall.

Each stall entry gate 9 is fixed with an upstanding shaft 33 journaled in connection with the adjacent end of the central wall unit 8. Above this shaft, a horizontal shaft 34 extends the full length of the row of stalls, this shaft being constantly driven in one direction by a motor 35. Shaft 34 is journaled in bearings 36 carried by a fixed beam 37 extending parallel to and under said shaft. Shaft 33 is radial with shaft 34, and at its upper end carries a mutilated bevel gear 38. This gear is adapted to be engaged on one side or the other by an opposed bevel gear unit 39 slidably keyed on shaft 34 and provided at one end with a shifting fork 40. This fork is mounted on a shaft 41 which extends to wall 5 and has a radial arm 42 thereon adjacent said wall. A connecting rod 43 extends between this arm and another arm 44 lower down, and which is radial with a stub shaft 45 projecting through wall 5. On the outside of said wall, shaft 45 is provided with a crank handle 46 cooperating with a quadrant plate 47 (see Fig. 10). By this means, the gear unit 39 may be shifted in one direction or the other from the milking floor 6.

The gear 38 is positioned on shaft 33 relative to the door 9 so that when the latter is either fully open or fully closed, the mutilated or toothless portion of said gear faces and is clear of one or the other of the gears of unit 39.

Shifting of the gear unit 39 only in one certain direction will then place a gear of the unit in meshing engagement with gear 38, which will then be rotated until the teeth of gear 38 leave those of the gear unit. Gear 38 is of course designed and disposed relative to the direction of rotation of drive shaft 34 so that such rotation of gear 38 is only sufficient to swing gate 9 through the arc necessary to fully open or close it. A snap action spring 48 is applied to the gate to complete its movement in either direction and insure positive disengagement of the teeth of the previously cooperating gears.

Once the gate has been opened or closed, the operator may, if desired, shift the gear unit to a neutral position, although this is not essential, since obviously no further movement of the gate can take place until the gear unit is positively shifted in the opposite direction.

When gate 9 swings open, keeper pin 29 of the latch 28 of gate 15 is released at the same time by the following means. A bell crank 49 is mounted in a fixed position adjacent shaft 33, in a plane parallel to and alongside beam 37, one leg of this bell crank being substantially horizontal and having a roller 50 at its outer end.

This roller projects into the path of a cam 51 fixed on the shaft 33.

The other and upstanding leg of the bell crank is connected to a pull element 52, which is common to the bell cranks 49 of all the stalls, and which extends to a connection with one end of a bell crank unit 53 (see Fig. 3), the other leg of which is connected to pin 29. The cam is positioned on the shaft so that as the latter turns in a direction to open the gate 9, element 52 will be pulled and the pin 29 will be lifted. This will release latch 28 and allow spring 27 to pull gate 15 to an open position.

Exit gate 10 is fixed on a vertical shaft 54 journaled in connection with the adjacent end of railing or wall 8. The gate when closed is held latched by the engagement of a vertical spring bar 55 on the gate with a crotch member 56 fixed on the adjacent end wall 7.

The shaft 54 at its upper end carries a mutilated bevel gear 57 adapted to be alternately engaged on opposite sides by a bevel gear unit 58 slidably keyed on driven shaft 34. This gear unit is shifted in the same manner and for the same purpose as unit 39, from another hand crank handle 59 disposed on the same side of wall 5 as handle 46, and spaced horizontally from the latter.

The shifting mechanism includes a connecting rod 60 operatively connected to the handle and to a combination arm and cam member 61 fixed on the transverse shaft 62 on which the shifting fork 63 is mounted. The gear unit and mutilated gear are so arranged relative to each other that with shifting of the gear unit in one direction, the gate will be swung open and the gearing then disengaged, and when the unit is swung in the opposite direction, the gate is swung closed to a latched position and the gearing again disengaged. A snap action spring 64 completes the gate opening and closing movements, as in the case with gate 9.

As the member 61 swings with shaft 62 to shift gear unit 58 in a direction to open the gate, the spring bar 55 is pushed clear of crotch 56 before the gears actually become engaged, by the following means:

Pivoted at its lower end in a housing mounted in fixed connection with and behind the crotch is a tongue 66, projecting at its upper end from the housing between the sides of the crotch in position to engage the bar 55. The tongue is connected to a pull rod 67 extending upwardly to one leg of a bell crank unit 68 mounted on end wall 7 adjacent the top. The other leg of this bell crank is connected by a pull rod 69 with one end of a horizontal lever 70. This lever is pivoted intermediate its ends in connection with wall 5 and at its other end carries a roller 71 projecting under the cam surface 61a of member 61. This cam surface is arranged so that with the initial rotation of shaft 62 in a direction to effect opening of the gate, the adjacent end of lever 70 is depressed. This causes rod 67 to be pulled, which swings tongue 66 so that its outer end is advanced against bar 55, pressing the same toward the gate so that it clears the crotch, and thus allows the gate to be swung open when the gate shaft 54 and drive shaft 34 become engaged in driving relation.

Cut through wall 5 at each stall is a relatively large opening 72. This opening is disposed on a level and in a horizontal position approximately the same as that of the udder of a cow in the stall, and is sufficiently large to enable the milker on floor 6 to conveniently attach the teat cups of a conventional milking machine to the cow.

The milking floor being at a level considerably below that of the stalls, facilitates the operations of the milker, since stooping over is avoided. The gate control handles 46 and 59 are disposed on opposite sides of opening 72 in a convenient position.

As a result of the arrangement and operation of parts of the system as above described, control of cow movements, as well as milking operations, are so easily and quickly effected that one milker has no trouble in taking care of the milking of a large number of cows in a given time. Also, the milking floor or room being entirely separate from the cow stalls, it is much easier to keep the milking apparatus clean than is ordinarily the case.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a cow milking system, a passageway for cows in single file order, a row of milking stalls for individual cows extending parallel to and along said passageway on one side thereof, said passageway extending back from the row of stalls some distance, separate entry and exit gates for each stall at opposite ends thereof, means mounting said gates for independent movement from a stall closing position to a passageway closing position, manually operable means to control the movement of the gates, another gate normally closing the passageway back of the stalls and means functioning with the movement of any entry gate to a passageway closing position for controlling the opening of said other gate.

2. In a cow milking system, a passageway for cows in single file order, a milking stall for an individual cow disposed on one side of and parallel to the passageway some distance beyond its entry end, an entry gate for the stall arranged for movement from a stall closing position to one across the passageway and then giving access to the stall from said entry end of the passageway, manually operable means to control such movement of the gate, another normally closed gate across the passageway back of the stall, and instrumentalities between the gates to allow the latter gate to open with the movement of the entry gate to a passageway closing position.

3. In a cow milking system, a passageway for cows in single file order, a milking stall for an individual cow disposed on one side of and parallel to the passageway some distance beyond its entry end, an entry gate for the stall arranged for movement from a stall closing position to one across the passageway and then giving access to the stall from said entry end of the passageway, manually operable means to control such movement of the gate, another normally closed gate across the passageway back of the stall, means tending to open said other gate, releasable holding means normally preventing such opening movement and means to release said holding means by movement of the entry gate to a passage closing position.

4. In a cow milking system, a passageway for cows in single file order, a milking stall for an individual cow to which the passageway leads, a hinged entry gate for said stall opening in a direction back from the stall, manually operable means to control the opening and closing of said gate, another gate normally closing the passageway back of the entry gate, and means to control the opening of said other gate by opening movement of the entry gate.

5. In a cow milking system, a passageway for cows in single file order, a milking stall for an individual cow to which the passageway leads, an entry gate for said stall, manually operable means to control the opening and closing of said gate, another gate normally closing the passageway back of the entry gate, and means to control the opening of said other gate by opening movement of the entry gate, without corresponding closing of the other gate by closing movement of the entry gate, and means actuated by the weight of a cow approaching said other gate to close the same.

6. A system as in claim 5 in which said last named means comprises a depressible platform across the passageway back of said other gate a distance greater than the length of a cow, and means between the other gate and the platform to close said gate upon depression of the platform by the weight of a cow thereon.

7. In a cow milking system, a passageway for cows in single file order, a milking stall for an individual cow to which the passageway leads, a gate normally closing the passageway back of the stall, means controlled from adjacent the stall to allow said gate to open, another passageway gate back of said first named gate, manual means to control the opening of said other gate, and means actuated by the weight of a cow at a predetermined point between the gates to close both gates.

8. In a cow milking system, a milking stall for an individual cow, an entry gate for the stall, a vertical turnable shaft on which said gate is secured on one side, a drive shaft beyond the vertical shaft at one end, and with respect to which the latter is radial, a mutilated bevel gear on said end of the vertical shaft, a shiftable double bevel gear unit on the drive shaft to alternately engage said mutilated gear from opposite sides; the mutilated portion of said gear being positioned relative to the gate and being of such arcuate extent that with the gate closed, said portion is clear of the teeth of one gear of the unit, and when the gate is open, said portion is clear of the teeth of the other unit, there being means to rotate the drive shaft in one direction only.

9. A structure as in claim 8 with a snap action spring applied to the gate to complete the opening and closing movements thereof.

10. In a cow milking system, a milking stall for an individual cow, a normally closed gate for said stall, a releasable latch to normally prevent opening of the gate, normally disengaged power means to open the gate, a manually rotatable shaft, means between the shaft and the latch to release the latter upon the initial rotation of the shaft from a predetermined starting position and means between the shaft and power means to engage the latter with the gate upon a further rotation of the shaft.

11. In a cow milking system, a milking stall for an individual cow, a normally closed gate for said stall, a releasable latch to normally prevent opening of the gate, power operated means to open the gate, normally disengaged drive elements included in said power means, a lever operatively connected to the latch and whose movement in one direction releases said latch, a manually rotatable shaft, a cam fixed on said shaft, the cam being disposed to overhang the lever at one end and to move the same in said one direction with the initial rotation of the shaft from a predetermined starting position and a clutch engaging fork on the shaft functioning to shift the drive elements into engagement upon further rotation of the shaft.

JOHN J. DE CARLI.